June 10, 1941.                  H. HILL                    2,245,400
                              FLUSH VALVE
                         Filed April 16, 1938
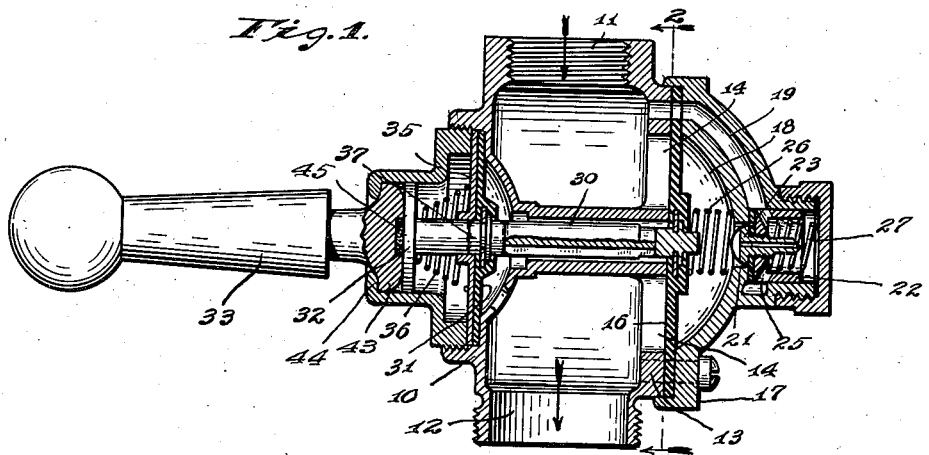
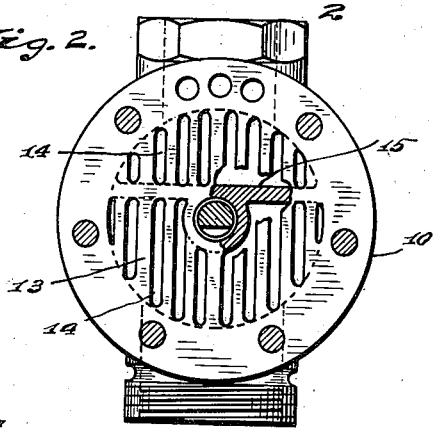
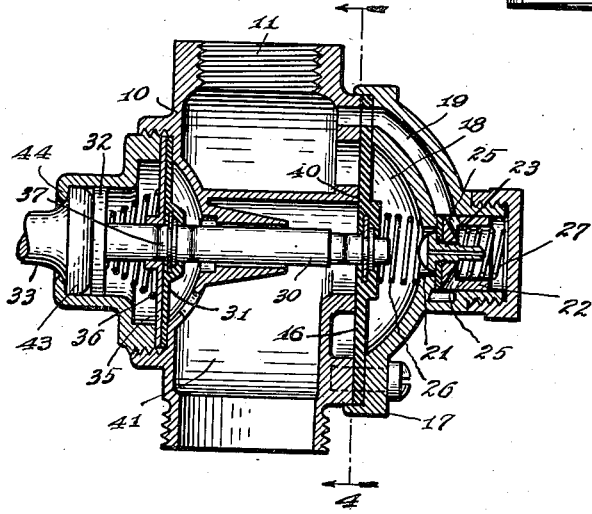
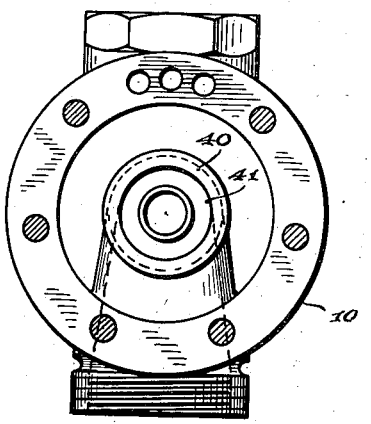
INVENTOR.
HUGH HILL,
BY
ATTORNEYS.

Patented June 10, 1941

2,245,400

UNITED STATES PATENT OFFICE 2,245,400

FLUSH VALVE

Hugh Hill, Anderson, Ind.

Application April 16, 1938, Serial No. 202,404

6 Claims. (Cl. 137—93)

This invention relates to flush valves, and has for its object the provision of a flush valve that will possess advantages over any other prior valve of which I am aware. More specifically, it is my object to produce a flush valve in which the valve-opening is positively effected by manipulation of the control member. A further object of my invention is to produce a valve which, when closed, will be held closed by fluid pressure but in which the valve-closing pressure will not interfere with a ready opening of the valve. Still another object of my invention is to produce an improved timing device for a flush valve.

In carrying out my invention, I form the valve with a hollow casing having inlet and outlet openings, and between these openings I provide a partition over which liquid can flow from one to the other. The valve member is in the form of a flexible diaphragm overlying such partition and operating when closed to prevent the flow of liquid thereover. The opposite side of the valve is exposed to a pressure chamber communicating through a restricted opening with the inlet of the valve casing. The restricted opening is provided in a movable member which may be displaced by excess pressure in the pressure chamber, and which, when so displaced opens an unrestricted by-pass between the pressure chamber and the inlet of the valve casing to provide a path of escape for liquid displaced from the pressure chamber by valve-opening movement.

The accompanying drawing illustrates my invention: Fig. 1 is an axial section through the valve; Fig. 2 is a section on the line 2—2 of Fig. 1; Fig. 3 is a view similar to Fig. 1 but illustrating a modified construction; and Fig. 4 is a section on the line 4—4 of Fig. 3.

The valve illustrated in the drawing comprises a hollow body or casing 10 having an inlet opening 11 and an outlet opening 12. At one side of the casing, the passage between the inlet and outlet openings is defined by a grid 13 having a multiplicity of openings 14. A partition 15 extending across the valve casing between the grid 13 and the opposite wall of the casing serves to prevent flow from the inlet opening 11 to the outlet opening 12 except by way of the grid-openings 14.

In the assembled valve, the grid 13 is covered by a valve member 16 in the form of a disk of rubber or other resilient material desirably with its central portion stiffened. The stiffening may be obtained by using a metal insert, which may also provide a bearing boss for engagement by the operating member described below. The valve member is held in place by a cover 17 which engages the valve member at its periphery but which is spaced outwardly from the central portion of the valve member to define a pressure chamber 18. The cap 17 is provided with a passage 19 providing communication between the inlet opening 11 and the pressure chamber 18 through an opening 21 in the wall of the latter. In normal condition, the opening 21 is closed by a movable valve member 22, conveniently in the form of a cup the bottom surface of which is covered with a washer of resilient material overlying the outer end of the opening 21. This washer may be held in place by a screw 23.

The timing of the valve is controlled by the effective area of a passage, conveniently a passage extending axially through the screw 23, which connects the chamber 18 with the interior of the cup 22. This cup is arranged, as by providing its side wall with an annular series of openings 25, so that its interior will always communicate with the passage 19. A spring 26 acting against the outer face of the valve 16 tends to hold it seated on the grid 13. A similar spring 27 acting on the cup 22 serves normally to hold it seated over the opening 21, in which condition the only path of communication between the inlet opening 11 and the chamber 18 is by way of the axial passage in the screw 23.

It will be apparent from the construction as so far described that with the opening 21 closed and with the same fluid pressure acting on both sides of the valve disk 16 that disk will be firmly held against the grid 13 by reason of the fact that fluid pressure in the chamber 18 acts over the entire area of the valve while fluid pressure on the opposite face of the valve acts only over the area of the openings 14 in the grid. The spring 26 assists in normally holding the valve against the grid. If the valve is moved away from its seat on the grid 13, however, liquid can flow through the openings 14 on the inlet side of the partition 15, into the space between the grid 13 and the valve member 16, and thence through the other openings 14 in the grid to the outlet opening 12. This movement of the valve 16 from the grid 13, however, will require displacement of liquid from the chamber 18. Such displaced liquid forces the cup 22 from its seat over the opening 21 and escapes by way of the passage 19. As soon as the displacement of the liquid from the chamber 18 is complete, the spring 27 seats the cup 22 to close the opening 21. The valve 16, however, can not return to its seat except as liquid enters the chamber 18 through the restricted passage in the screw 23, and the size of this passage therefore controls the length of the period during which the valve remains open. As soon as sufficient liquid has entered the chamber 18 through the restricted passage in the screw 23, the valve 16 will engage the face of the grid 13, closing the openings 14 and preventing further discharge of liquid.

The means employed to move the valve 16 from its seat on the grid 13 may take different forms. In the form illustrated, I provide an actuating member 30 which extends through a suitable guide from the valve member 16 across the casing into association with a flexible diaphragm 31. The opposite side of the diaphragm 31 is engaged by a plunger 32 that can be moved inwardly by an operating handle 33. Conveniently, the diaphragm 31 is supported against liquid pressure within the valve casing by means of a rigid disk 35 which may also serve as a bearing or support for the inner end of the plunger 32. A spring 36 acting between the plunger 32 and the disk 35 serves yieldingly to hold the plunger 32 retracted and to maintain the handle 33 in its normal position.

To transmit force from the plunger 32 to the actuating member 30, the diaphragm 31 desirably carries at its center a thrust member 37 of metal or other rigid material. The thrust member 37 may be held in place in the diaphragm by providing it with an external annular flange which is embedded in the diaphragm when it is made.

The handle 33 is mounted by means of a head 43 received within the cylinder in which the plunger 32 rides and behind an inwardly projecting rim 44. Movement of the handle 33 tilts the head 43 about a point of support afforded by the rim 44, to move an opposite portion of such head against the plunger 32, to force such plunger inwardly. To supply lubricant between the engaging faces of the head 43 and plunger 32, a cavity 45 in the flat central portion of the head 43 is packed with absorbent material saturated with lubricant. Movement of the plunger will be transmitted through the thrust member 37 and actuating member 30 to the valve 16, forcing such valve from its seat with the result above described.

The valve illustrated in Figs. 3 and 4 operates in the same way as that shown in Figs. 1 and 2. In the valve of Figs. 3 and 4, however, the grid 13 and partition 15 are omitted and the valve 16 seats against a valve-seat 40 defining the inlet opening of a passage 41 which communicates with the outlet opening 12 of the casing 10.

I claim as my invention:

1. A flush valve, comprising a hollow body having spaced inlet and outlet openings, a partition extending across the interior of said body between said inlet and outlet openings, one side wall of said body having a plane outer surface and being provided with openings therethrough on opposite sides of said partition to form a grille, a cover for said grille, a valve disk of flexible material interposed between said grille and cover and seating upon the grille, said cover being spaced from said valve-disk over the center portion thereof to define a pressure chamber, said cover being provided with a passage affording communication between said pressure chamber and the interior of said body on the inlet side of said partition, a valve member disposed in said passage and movable toward said chamber to close, a restricted passage through said valve member, means biasing said valve member toward closed position, and means for forcing said valve disk from its seat on said grille.

2. A flush valve, comprising a hollow body having spaced inlet and outlet openings, a partition extending across the interior of said body between said inlet and outlet openings, one side wall of said body having a plane outer surface and being provided with openings therethrough on opposite sides of said partition to form a grille, a cover for said grille, a valve disk of flexible material interposed between said grille and cover and seating upon the grille, said cover being spaced from said valve-disk over the center portion thereof to define a pressure chamber, said cover being provided with a passage affording communication between said pressure chamber and the interior of said body on the inlet side of said partition, a check-valve in said passage opening away from said chamber, a restricted by-pass communicating with said passage and chamber on opposite sides of said check valve, and means for forcing said valve disk from its seat on said grille.

3. A flush valve, comprising a hollow body having spaced inlet and outlet openings, a partition extending across the interior of said body between said inlet and outlet openings, one side wall of said body being provided with openings therethrough on opposite sides of said partition to form a grille, a cover for said grille, an imperforate valve disk of flexible material seating upon the grille, the peripheral portion of said valve disk being interposed between said grille and cover, those portions of said side wall which are respectively provided with openings and engaged by the peripheral portion of said valve disk being in the same plane, said valve disk being normally flat so as to be unstressed when seated upon said grille, said cover being spaced from said valve-disk over the center portion thereof to define a pressure chamber, said cover being provided with a passage affording communication between said pressure chamber and the interior of said body on the inlet side of said partition, means regulating the rate of fluid flow through said passage toward said chamber, and mechanical means for forcing said valve disk from its seat on said grille, irrespective and independently of fluid pressure on opposite sides of said valve disk.

4. In a flush valve, a hollow body having inlet and outlet openings, said body being provided with a pressure chamber, a valve seat, an imperforate valve-forming diaphragm partially defining said chamber and movable by fluid-pressure therein into contact with said valve seat to prevent flow from said inlet opening to said outlet opening, said body being provided with a passage affording communication between said inlet opening and said chamber, a check valve in said passage opening away from said chamber, a restricted by-pass communicating with said passage and said chamber on opposite sides of said check valve, and manually operated mechanical means engaging said diaphragm near the center thereof for positively forcing it away from said valve seat, irrespective and independently of fluid pressures on opposite sides of said diaphragm.

5. In a flush valve, a hollow body having inlet and outlet openings, said body being provided with a pressure chamber, a valve seat, an imperforate valve-forming diaphragm partially defining said chamber and movable by fluid-pressure therein into contact with said valve seat to prevent flow from said inlet opening to said outlet opening, a valve-operating member secured to said diaphragm near the center thereof and extending through said valve seat, a second flexible diaphragm disposed adjacent the end of said valve-operating member, a thrust-transmitting element carried by said second diaphragm near the center thereof in position to engage the adjacent end of said valve-operating member, and a manually operated actuating member disposed in line with said valve-operating member and said thrust-transmitting element on the opposite side of said diaphragm from said valve-operating member and movable to engage said thrust-transmitting element to move it and said valve-operating member and lift the valve-forming diaphragm from its seat.

6. In a flush valve, a hollow body having inlet and outlet openings, said body being provided with a pressure chamber, a valve seat, an imperforate valve-forming diaphragm partially defining said chamber and movable by fluid-pressure therein into contact with said valve seat to prevent flow from said inlet opening to said outlet opening, a valve-operating member secured to said diaphragm near the center thereof and extending through said valve seat, a second flexible diaphragm disposed adjacent the end of said valve-operating member, a thrust-transmitting element carried by said second diaphragm near the center thereof in position to engage the adjacent end of said valve-operating member, and means for moving said thrust-transmitting element toward said valve-operating member for lifting the valve-forming diaphragm from its seat.

HUGH HILL.